United States Patent
Kuo-Tseng

[19]

[11] Patent Number: 5,828,438
[45] Date of Patent: Oct. 27, 1998

[54] BRIDGE PAD AND MOUNTING STRUCTURE FOR ATTACHMENT TO SPECTACLES

[75] Inventor: Lin Kuo-Tseng, Taipei, Taiwan

[73] Assignee: Gazelle Corporation, Taipei, Taiwan

[21] Appl. No.: 831,436

[22] Filed: Apr. 1, 1997

[51] Int. Cl.⁶ ..................................................... G02C 5/12
[52] U.S. Cl. ............................................ 351/137; 351/136
[58] Field of Search ..................................... 351/136, 138, 351/139, 137

[56] References Cited

U.S. PATENT DOCUMENTS 3,345,121  10/1967  Angels ..................................... 351/137
4,818,092  4/1989  Bononi .................................... 351/138

Primary Examiner—Huy Mai
Attorney, Agent, or Firm—Rosenberg, Klein & Bilker

[57] ABSTRACT

The present invention relates to a bridge structure of a spectacles, which including a bridge bracket and a pad bridge, co-operating with a spectacles and a screw. Wherein the bridge bracket is shaped like an inverted V letter and fixed on the middle bottom side of the spectacles with a groove, and has a clamp-splice with a clamping slot and a containing slot at the top corner for holding a embedding portion of the pad bridge on, in which said pad bridge is made of a n elastomer cladding over a metal chip-die, and said embedding portion is a thinner segment at the middle part of the pad bridge. As the embedding portion is located in the containing slot of the clamp-splice of the bridge bracket, the two hanged free ends can be adjusted to meet the requirement of the wearer.

2 Claims, 4 Drawing Sheets

BRIDGE PAD AND MOUNTING STRUCTURE FOR ATTACHMENT TO SPECTACLES

BACKGROUND OF THE INVENTION

1. Field of the Invention

The present invention relates to a bridge structure of a spectacles, and more particularly to a pad bridge that can be adjusted on the bridge bracket for making wearer feel more comfortable.

2. Description of Prior Art

In accordance with a conventional pad bridge on a bridge bracket of a spectacles, referring to FIG. 1, the pad bridge is made of elastomer material, and attached on the inside of the bridge bracket as a setting strip co-ordinating to the shape of the bridge bracket with a socket joint at the matching surfaces. There are two elastomers extending downward for encasing the lower part of the bridge bracket excepting the clamps fixing the lens, and along the edge of the bridge bracket there is a groove formed for the rim the pad bridge clamping on. In this case, the pad bridge is fixed on the bridge bracket inability to be adjusted to suit the wearer nose any way, therefore it often makes the wearer feel uncomfortable. On the other hand, the matching surfaces between the pad bridge and the bridge bracket are so small that the connecting parts like plugging pins and sockets are sized so small that brings about processing difficulty.

OBJECTS AND SUMMARY OF THE INVENTION

It is therefore one object of this invention to provide a pad bridge that can be adjusted on the bridge bracket according to the requirement of the wearer with a simple structure.

The present invention relates to a bridge structure of a spectacle, which including a bridge bracket and a pad bridge, co-operating with a spectacle and a screw. Wherein the bridge bracket is shaped like an inverted V and fixed on the middle bottom portion of the spectacles with a groove at one side, and has a clamp-splice with a clamping slot and a containing slot at the top corner for holding an embedding portion of the pad bridge on, in which the pad bridge is made of an elastomer cladding over a metal chip-die, and the embedding portion is a thinner segment at the middle part of the pad bridge. As the embedding portion is located in the containing slot of the clamp-splice of the bridge bracket, the two hanged free ends can be adjusted to meet the requirement of the wearer.

DETAILED DESCRIPTION OF PREFERRED EMBODIMENTS

Figure 1:
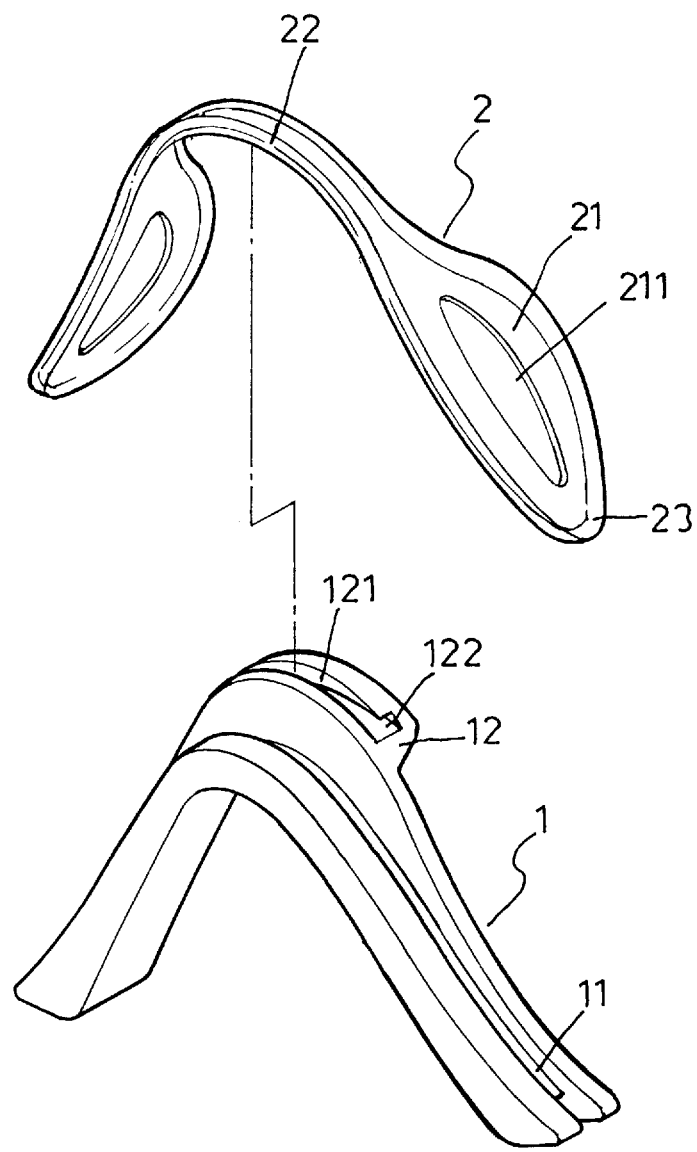
FIG. 1 is an exploded view of the present invention.

Referring to FIG. 1, the present invention includes a bridge bracket 1 and a pad bridge 2, co-operating with a spectacles 3.

The bridge bracket 1 has an inverted V bracket corresponding and securing to the middle bottom portion of the spectacles; there is a groove 11 formed along the edge of the outer side, and a clamp-splice 12 extending toward the inner side from the top part as the corner of the inverted V, and a narrower crossing clamping slot 121 and a wider crossing containing slot 122 formed on the top side to the downward sequentially.

The pad bridge 2 is made of an elastomer cladding over a metal chip-die 21 shaped depends on the shape of the metal chip-die 21 as a inverted V in normal, in the centre portion there is a narrower part as an embedding portion, from both ends of the embedding portion, the pad bridge 2 extends two curved retainers 23 gradually and separately, and an opening 211 pre-set on the proper position of each retainer 23.

Figure 2:
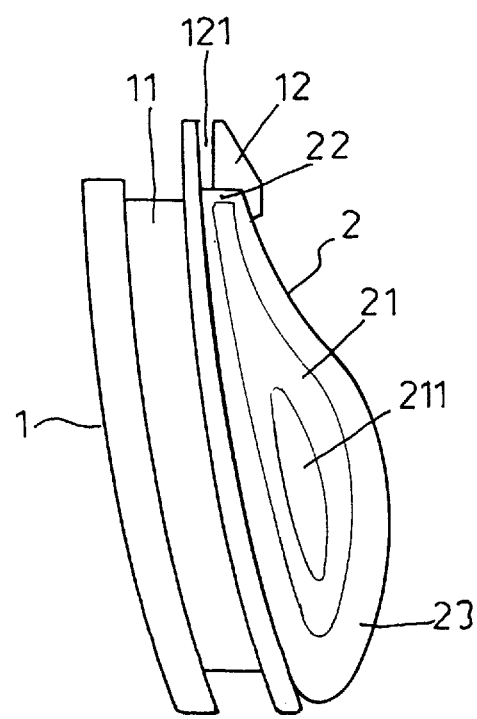
FIG. 2 is a side view of the present invention.
Figure 3:
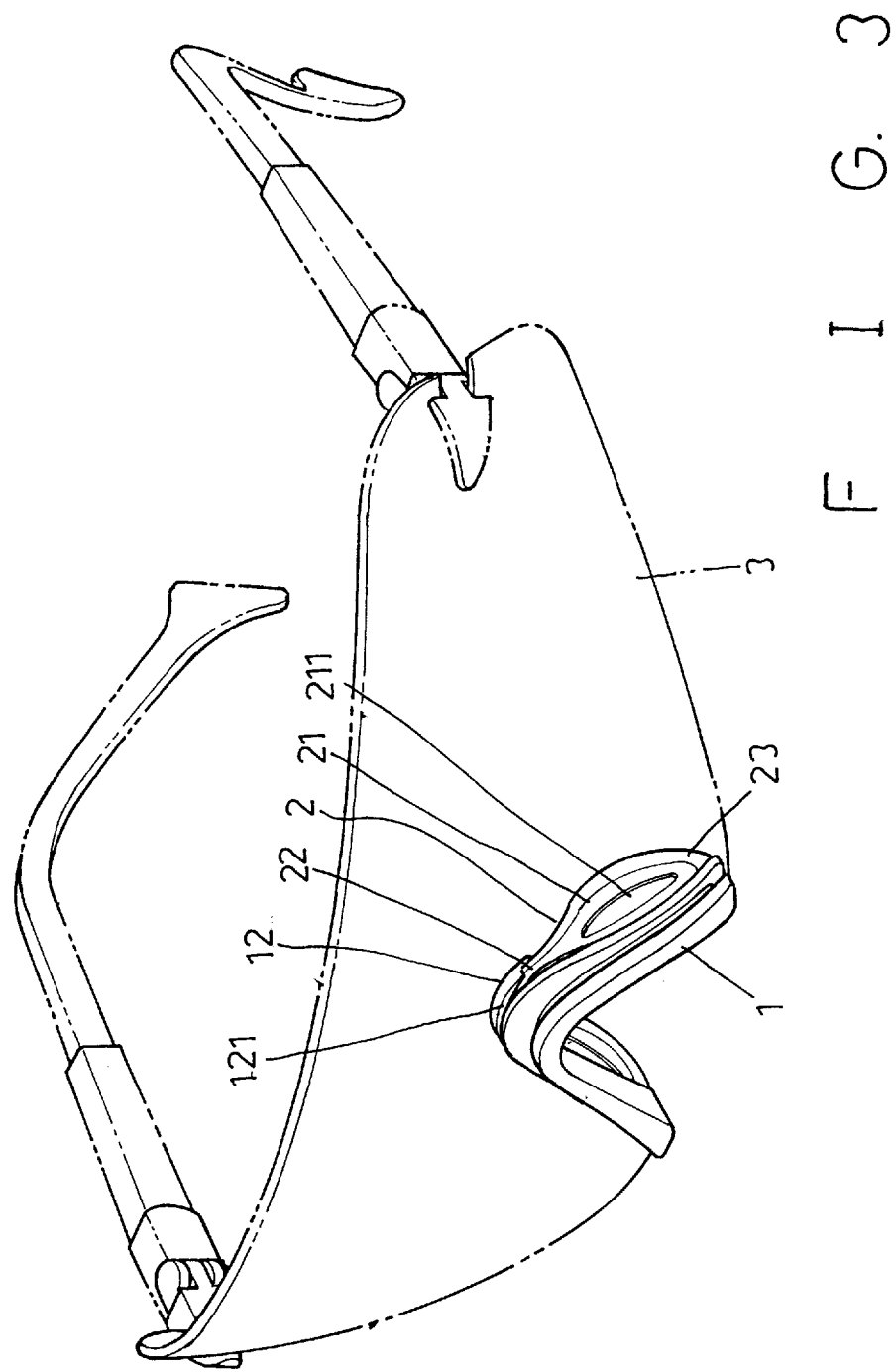
FIG. 3 is a solid view showing an operation of the present invention.

In practising, referring to FIG. 2 and FIG. 3, the bridge bracket 1 is fixed on the middle bottom side as an inverted V gap of the spectacles by clamping in said groove 11, then making the embedding portion 22 slide through the clamping slot 121 with the narrower side to get the containing slot 122 of the clamp-splice 12, and turn the embedding portion 22 with the wider side seating in the containing slot 122, this causes the pad bridge 2 to be clamped in the clamp-splice 12 of the bridge bracket 1. Applying the flexibility of the clad metal chip-die 21, by means of adjusting the opening and the shape of the inverted V pad bridge, to meet the requirement of the wearer to make the wearer feel as snug as a bug in a rug.

Figure 4:
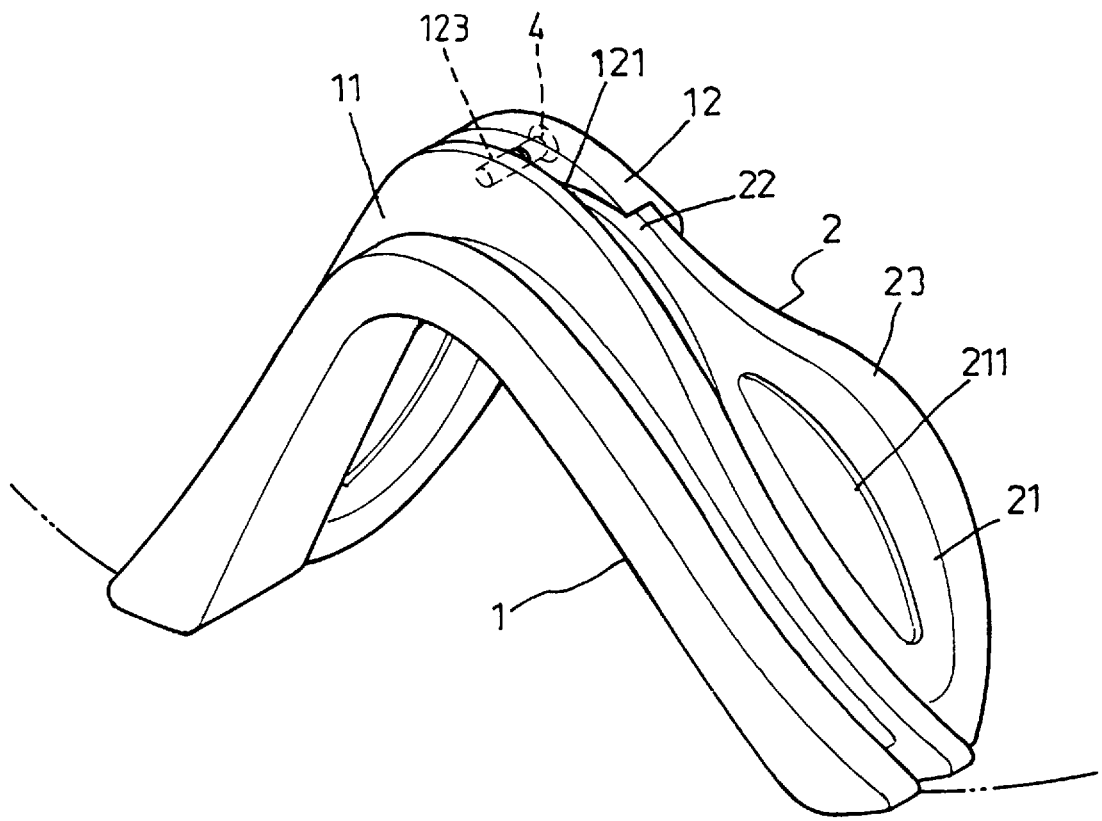
FIG. 4 is a solid view showing an operation of the present invention.

For intensifying clamping to the pad bridge 2, referring to FIG. 4, increasing a threaded hole 123 on the clamp-splice 12 crossing the clamping slot 121, as the pad bridge 2 is seated in the containing slot 122 screwing a screw 4 in the threaded hole 123 presses closing the opening of clamping slot 121 so that the embedding portion 22 of the pad bridge 2 is held more tightly.

I claim:

1. An adjustable bridge structure for spectacles, comprising:

a bridge bracket having an inverted V-shaped contour and a groove formed on an outer surface thereof for receiving a bridge portion of a pair of spectacles therein, said bridge bracket having a clamp splice formed at an apex portion thereof and extending from an inner side of said bridge bracket, said clamp splice having a narrow clamping slot formed in an upper surface thereof and a wide containing slot formed transversely with respect to said to said clamping slot and in open communication therewith; and, a bridge pad coupled to said bridge bracket, said bridge pad being formed by a metal chip-die having a predetermined contour and an elastomer cladding on said metal chip-die, said bridge pad having a narrow central portion disposed between a pair of curved retainer portions formed on opposing ends thereof defined by said predetermined contour of said metal chip-die, each of said pair of curved retainer portions having an opening formed therethrough, said narrow central portion of said of said bridge pad being disposed in said containing slot and said pair of curved retainer portions being adjusted to fit a user by bending said metal chip-die.

2. The adjustable bridge structure as recited in claim 1 where said clamp splice has a threaded hole formed therein and passing transversely through said clamping slot for receiving a screw therein to more tightly engage said bridge pad within said containing slot.

* * * * *